(12) United States Patent
Smith

(10) Patent No.: US 6,666,097 B2
(45) Date of Patent: Dec. 23, 2003

(54) METHOD AND DEVICE FOR MEASURING PUSHING AND PULLING FORCES

(75) Inventor: Robert T. Smith, Marysville, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/034,249

(22) Filed: Dec. 27, 2001

(65) Prior Publication Data

US 2003/0121333 A1 Jul. 3, 2003

(51) Int. Cl.[7] .............................. G01N 3/00; G01N 3/32
(52) U.S. Cl. .............................. 73/796; 73/808; 73/812; 73/849
(58) Field of Search ........................ 73/796, 808, 812, 73/849

(56) References Cited

U.S. PATENT DOCUMENTS

| 4,890,495 | A |   | 1/1990 | Slane |
|---|---|---|---|---|
| 5,142,910 | A |   | 9/1992 | Litchman |
| 5,585,568 | A | * | 12/1996 | Moncrief et al. ............. 73/788 |
| 5,641,260 | A | * | 6/1997 | Gray ......................... 414/401 |
| 5,641,917 | A | * | 6/1997 | Hurite et al. ............... 73/865.3 |
| 6,026,692 | A | * | 2/2000 | Brovold ....................... 73/818 |
| 6,086,517 | A |   | 7/2000 | Schapmire |
| 6,276,471 | B1 | * | 8/2001 | Kratzenberg et al. ....... 180/19.3 |
| 6,308,583 | B1 | * | 10/2001 | Gunness et al. ........ 73/862.631 |
| 6,446,511 | B1 | * | 9/2002 | Thornton et al. ............. 73/850 |

* cited by examiner

*Primary Examiner*—Edward Lefkowitz
*Assistant Examiner*—Andre Allen
(74) *Attorney, Agent, or Firm*—Rankin, Hill, Porter & Clark LLP; Alan T. McDonald; Vincent Ciamacco

(57) ABSTRACT

A force measuring device and method for determining a force required to move a cart. The force measuring device includes a force generating device, a load member, a load cell, and a controller. The force generating device is connected to the load member and moves the load member toward or away from the cart so as to apply pushing or pulling forces to the cart. The load cell is disposed between the load member and the cart, and transmits sensed force data to the controller. During a test, the controller collects the force data from the load cell. By testing carts of various configurations under all expected loading conditions, the performance of each cart configuration can be experimentally determined. The performance data is assembled in a database to permit a user to identify an optimum cart for an intended application.

25 Claims, 3 Drawing Sheets

METHOD AND DEVICE FOR MEASURING PUSHING AND PULLING FORCES

BACKGROUND OF THE INVENTION

In factories it is common for workers to push or pull carts for various reasons, such as to deliver parts and subassemblies between assembly stations or assembly lines. In the past, such carts were not specifically developed or manufactured for specific load ratings. Moreover, the loading of such carts was not controlled. Due to these two conditions, it is common for workers to overload the carts, or to select a cart that is not suitable for the loading condition. Therefore, workers commonly have difficulty moving the carts, resulting in reduced manufacturing efficiency and possibly injury to the worker.

Accordingly, there is a need in the art for a method and device to determine the forces required to move a cart. There also exists a need in the art for a method to determine an appropriate cart design based upon the expected loading and use of the cart.

SUMMARY OF THE INVENTION

Therefore, the present invention is directed toward a method and device to determine the forces required to move a cart. The present invention is further directed toward a method for determining an appropriate cart based upon the expected use of the cart.

In accordance with one aspect of the invention, a device for measuring forces exerted on a movable element includes a force generating and applying device, a load cell, and a controller. The force generating and applying device is selectively actuatable to move in a first direction and the force generating and applying device is operatively connected to the movable element so as to cause said movable element to move in the first direction. The load cell is connected to the force generating and applying device and is operable to sense the force exerted upon the movable element. The load cell transmits data corresponding to the sensed force to the controller. The controller receives the transmitted data and displays the transmitted data in a predetermined format.

In further accordance with the present invention, a device for measuring forces exerted on a cart to move the cart in a first direction is provided. The cart has a first end and a second end, a pair of casters being disposed under each of the first and second cart ends. The cart first end is adapted for engagement with a load member for application of forces to the cart. The device includes the load member, a force generating device, a load cell, and a controller. The load member has a proximal end and a distal end, the distal end being operatively engaged with the cart first end while the proximal end is operatively engaged with a force generating device. The force generating device is operable to move the load member in a first direction toward the cart and in a second direction away from the cart.

In accordance with a method of the present invention, the load member operatively engages the first end of the cart and the force generating device is actuated to move the load member in a first direction and thereby applies forces and moves the cart in the first direction. The load cell measures forces applied to the cart by the load member, and transmits measured forces to a controller. The controller displays the measured forces in a predetermined format.

In further accordance with the present invention, a method for identifying a preferred cart for a desired application from a plurality of possible carts, includes the steps of determining a maximum load for the desired application, accessing a database wherein each cart of the plurality of possible carts is correlated with a maximum force required to move the cart under the maximum load, and, selecting a cart from the plurality of carts by identifying the cart corresponding to the smallest maximum force under the maximum load. The selected cart is the preferred cart for the desired application.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
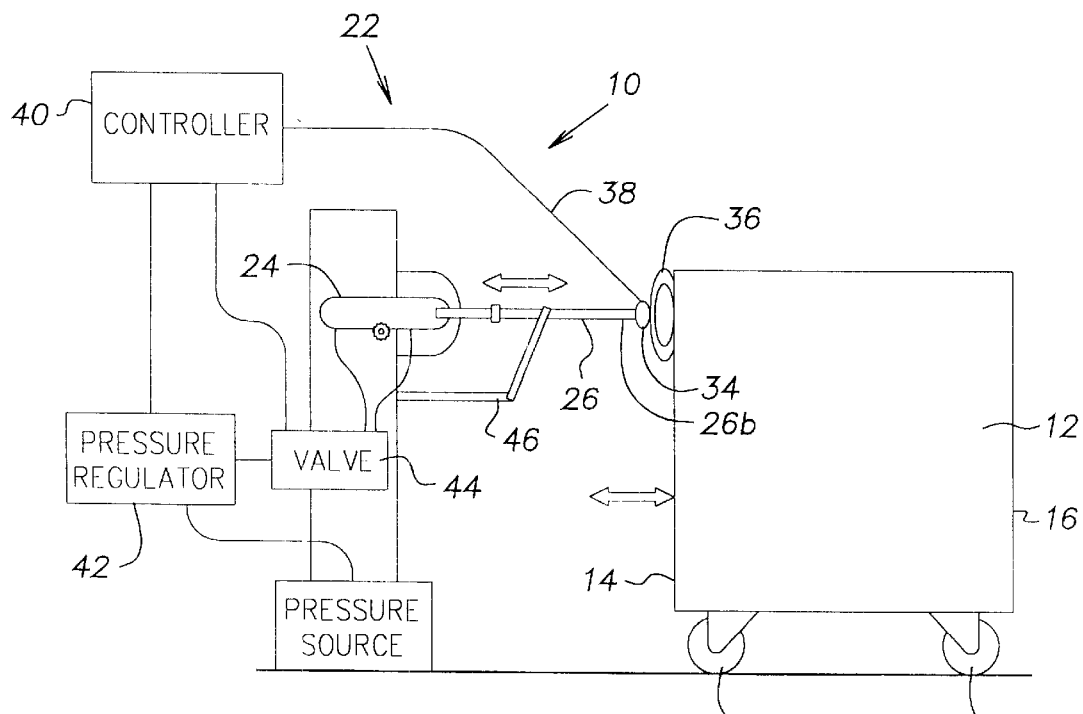
FIG. 1 schematically illustrates a first preferred embodiment of the present invention.

With reference to FIG. 1, a first preferred embodiment of the force measuring device 10 according to the present invention is schematically illustrated. The device 10 is shown in conjunction with a cart 12 that is pushed or pulled. The cart 12 includes a first end 14 facing the force measuring device 10 and a second, opposite end 16. Wheels 18, 20 are provided beneath each end of the cart. Conventionally, the set of wheels 18 under the first end 14 of the cart 12 are swivel casters, while the wheels 20 under the second end 16 of the cart 12 are fixed. Insofar as the general structure of the cart 12 is not the subject of the present invention, and since the present invention is not limited to use with any particular cart design, the structure of the cart will not be described in detail hereinafter.

The force measuring device 10 includes a force generating and applying device 22 that includes a force generating device 24 and a load member 26. The force generating device 24 is preferably a hydraulic cylinder that receives a piston 28 therein. Alternatively, a pneumatic cylinder could be used. The piston 28 is secured to a proximal end of the load member, which preferably is a rigid shaft if pushing and/or pulling forces are measured. If only pulling forces are being measured, a flexible cable, such as a multi-stranded high-tension cable, may be used, either alone or in combination with a rigid shaft, as the load member.

Figure 4:
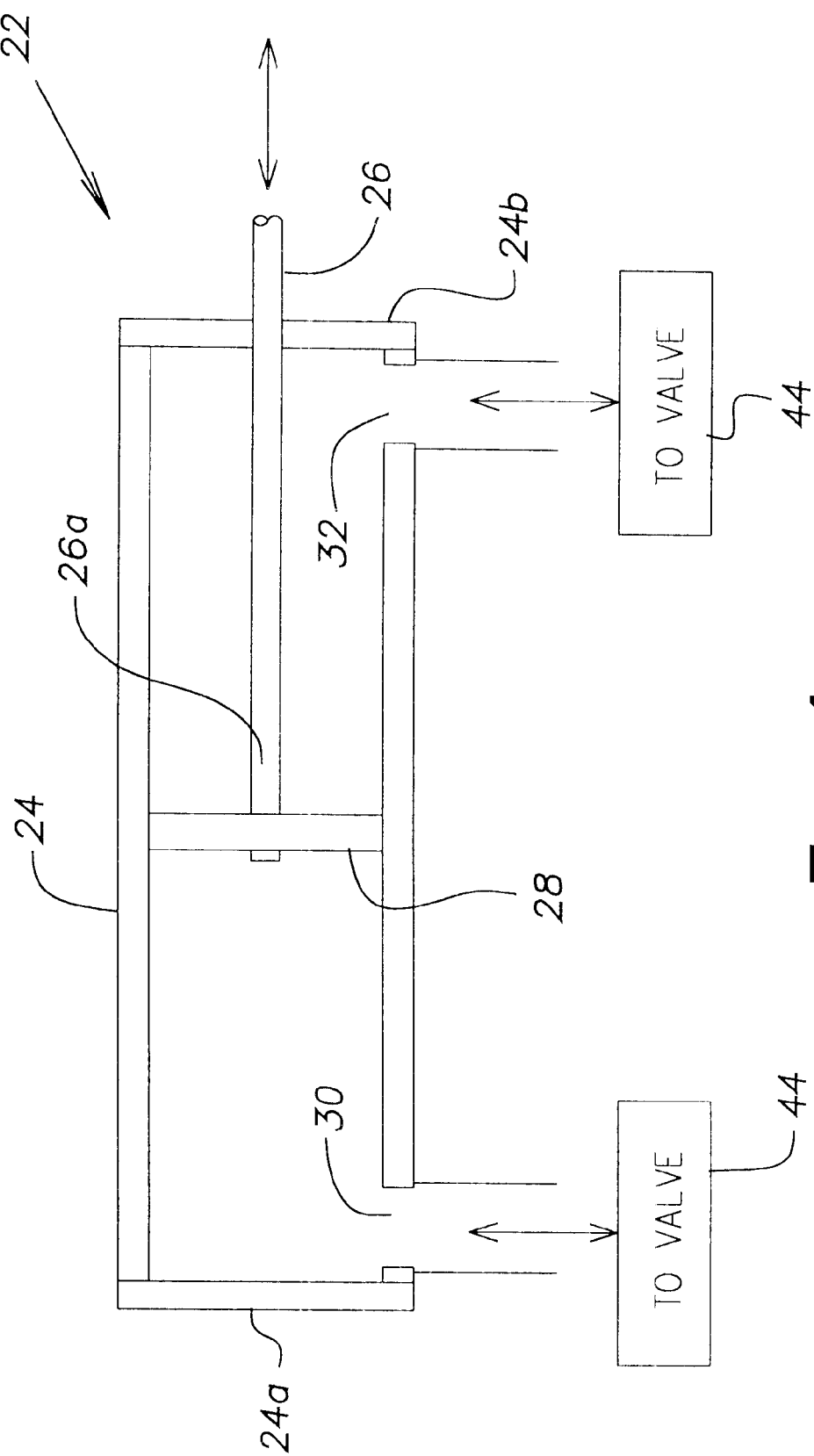

With reference to FIG. 4, and as will be apparent to those skilled in the art, the hydraulic cylinder 24 has a proximal end 24a remote from the cart 12 and a distal end 24b closer to the cart 12. The proximal end 24a of the hydraulic cylinder 24 has a first port 30 and the distal end 24b of the hydraulic cylinder 24 has a second port 32. The first and second ports 30, 32 are disposed on relatively opposite sides of the piston 28. Pressurizing fluid is introduced into one of the first or second ports 30, 32 while fluid is vented via the first or second port 30, 32 to permit the piston 28 to move in a first or second direction.

More specifically, in order to move the piston 28 in a first direction relatively toward the cart 12, pressurizing fluid is introduced into the cylinder 24 via the first port 30 and fluid is vented from the cylinder 24 via the second port 32. As such, the pressurizing fluid moves the piston 28 relatively toward the distal end 24b of the cylinder 24. Alternatively, in order to move the piston 28 in a second, opposite direction relatively away from the cart 12, pressurizing fluid is introduced into the cylinder 24 via the second port 32 and fluid is vented from the cylinder 24 via the first port 30. As such, pressurizing fluid moves the piston 28 relatively toward the proximal end 24a of the cylinder 24. The stroke of the piston 28 will determine the distance that the cart 12 is moved during a testing procedure, as will be discussed more fully hereinafter.

It is contemplated that the force generating device described herein may be replaced by other suitable force generating devices, it merely being required that a sufficient force be generated in a first and/or second direction to move the cart, as described hereinafter. Accordingly, the present invention is not to be limited to the preferred force generating device that specifically has been described herein in order to illustrate the best mode sufficiently to permit one skilled in the art to practice the present invention.

While a proximal end 26a of the load member 26 is connected to the force generating device (i.e., to the piston 28, FIG. 4), the distal end 26b is connected to the cart 12. In the illustrated first embodiment, a load cell 34 and a coupler 36 are interposed between the distal end 26b of the load member 26 and the cart first end 14, it being noted that the coupler 36 is optional, and is only desirable to use when pushing forces are to be measured. The coupler 36 assists in securing the distal end 26b of the load member 26 in the proper position relative to the cart 12 (i.e. at a desired height on the cart to simulate a normal push-height for a worker). The coupler also absorbs forces on the load cell 34 during the initial force ramp-up at the beginning of a test procedure, to be described hereinafter, and thereby prevents damage or malfunction of the load cell. The load cell 34 is operable to sense or measure forces applied by the load member 26 on the cart 12 during a test procedure. The sensed or measured force data from the load cell 34 is transmitted via a data line 38 to a controller 40.

The controller 40 is preferably a computer based control system that is operable to receive the sensed force data from the load cell and to display the received data in a predetermined format. While numerous display formats are possible, a preferred format includes the applied or sensed force versus time for each particular test. The controller 40 is also preferably operable to control actuation of the force generating device 24. For example, in the illustrated embodiment the controller is adapted to control a pressure regulator 42 to control the fluid pressure applied to the hydraulic cylinder 24. Moreover, the controller 40 is also preferably, yet optionally, adapted to control a solenoid valve 44 that selectively controls application of pressurized fluid into one of the first and second ports 30, 32 and venting of fluid from the other of the first and second ports 30, 32. In this regard it is noted that, due to frictional forces and mechanical tolerances, the level of pressure introduced into the cylinder 24 does not correspond exactly with the force applied to the cart 12 and sensed by the load cell 34. Accordingly, although monitoring the pressure level of the fluid introduced into the cylinder 24 may provide additional useful data, it is not considered necessary to practice the invention. Preferably, the controller 40 is further operable to receive user-input data, specifically data concerning the variable structural elements of the cart 12. Such variable structural elements include the physical data pertaining to the casters, including the size or diameter, manufacturer, and caster material. The input data and data that is sensed or measured is used to evaluate the test results and to assist in determining the proper cart components to be used in specific applications, as will be described more fully hereinafter.

A support device 46 vertically supports the load member 26 as it moves. In the embodiment schematically illustrated in FIG. 1, the support device 46 is disposed relatively below and slidably supports the load member 26. It is considered apparent that functionally equivalent support devices may be used to retain the load member 26 vertically throughout its travel and, accordingly, the present invention is not limited to that shown and described herein.

Figure 2:
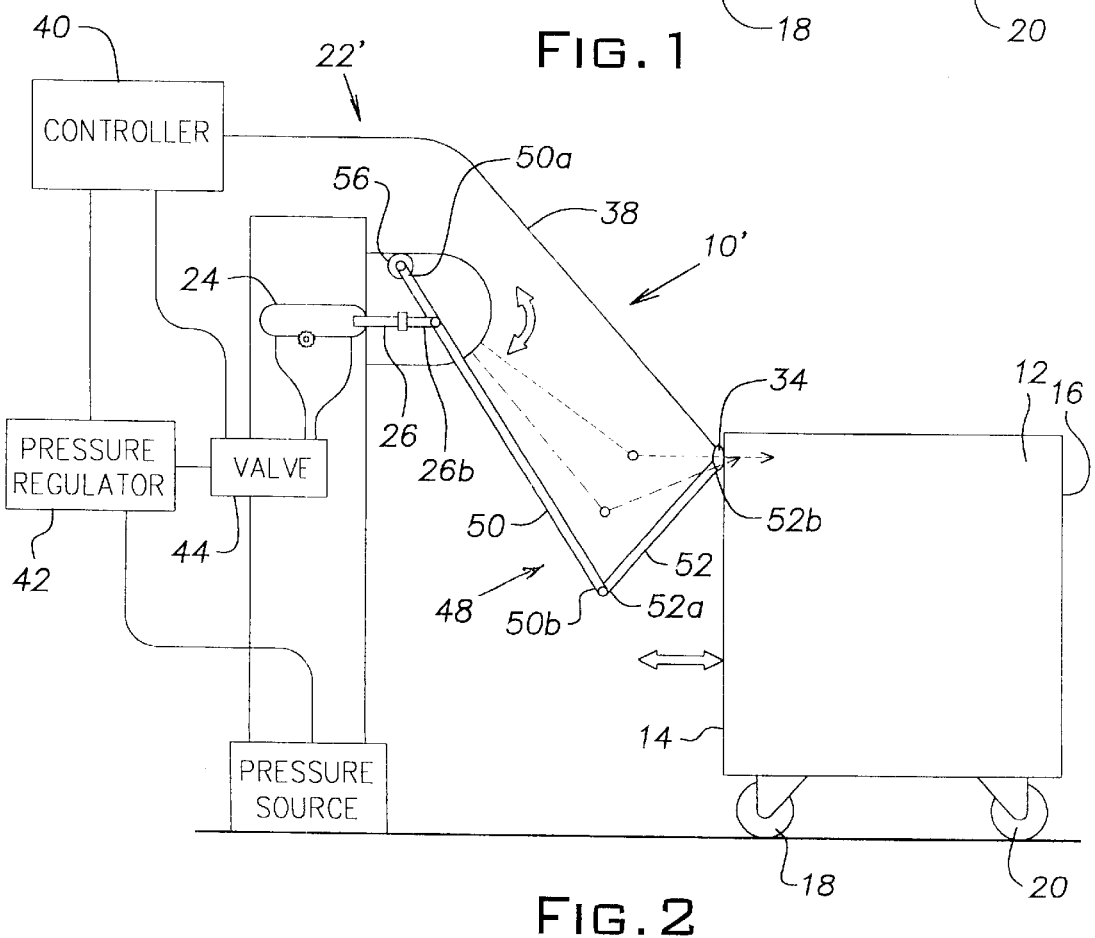
FIG. 2 schematically illustrates a second preferred embodiment of the present invention.

With reference to FIG. 2, a force measuring device 10' according to a second embodiment of the present invention is schematically illustrated. The force measuring device 10' is adapted to measure pushing and pulling forces, and includes a force generating and applying device 22' that includes a force generating device 24 and a load member 26, 48. The force generating device 24 is substantially identical to that described hereinbefore with regard to the first embodiment.

The load member, in addition to the rigid shaft 26 extending from the force generating device 24, includes a pivotal arm assembly 48. The pivotal arm assembly 48 is disposed between the shaft 26 and the cart 12, and includes an upper arm 50 and a lower arm 52. The upper arm 50 has a first end 50a and a second end 50b, the first end 50a being pivotally secured to a fixed support 56 and the second end 50b being attached to a first end 52a of the second arm 52. The pivot points at 50a, 50b, and 52b are preferably formed from protected flanged hinges to prevent twisting of the arms 50 and 52 during testing. The distal end 26b of the shaft 26 engages the upper arm 50 at a location relatively closer to the upper arm first end 50a than the upper arm second end 50b. A second end 52b of the lower arm 52 is in engagement with the cart 12, and is operable to communicate pushing and pulling forces to the cart 12. Preferably, the lower arm 52 has a length dimension, which is less than a length dimension of the upper arm 50. The load cell 34 is disposed between the lower arm second end 52b and the cart 12, as illustrated, and is operable, as in the first embodiment, to measure forces exerted on the cart 12.

When the piston 28 and shaft 26 move in a first direction (i.e., from a retracted position toward an extended position) relatively toward the cart 12, the upper arm 50 pivots about the fixed support 56 such that the second end 50b of the upper arm 50 moves upwardly and toward the cart 12, as illustrated by the dashed lines in FIG. 2. Alternatively, when the piston 28 and shaft 26 move in a second direction (i.e., from an extended position toward a retracted position) relatively away from the cart 12, the upper arm 50 pivots about the fixed support 56 such that the second end 50b of the upper arm moves downwardly and away from the cart.

Figure 3:
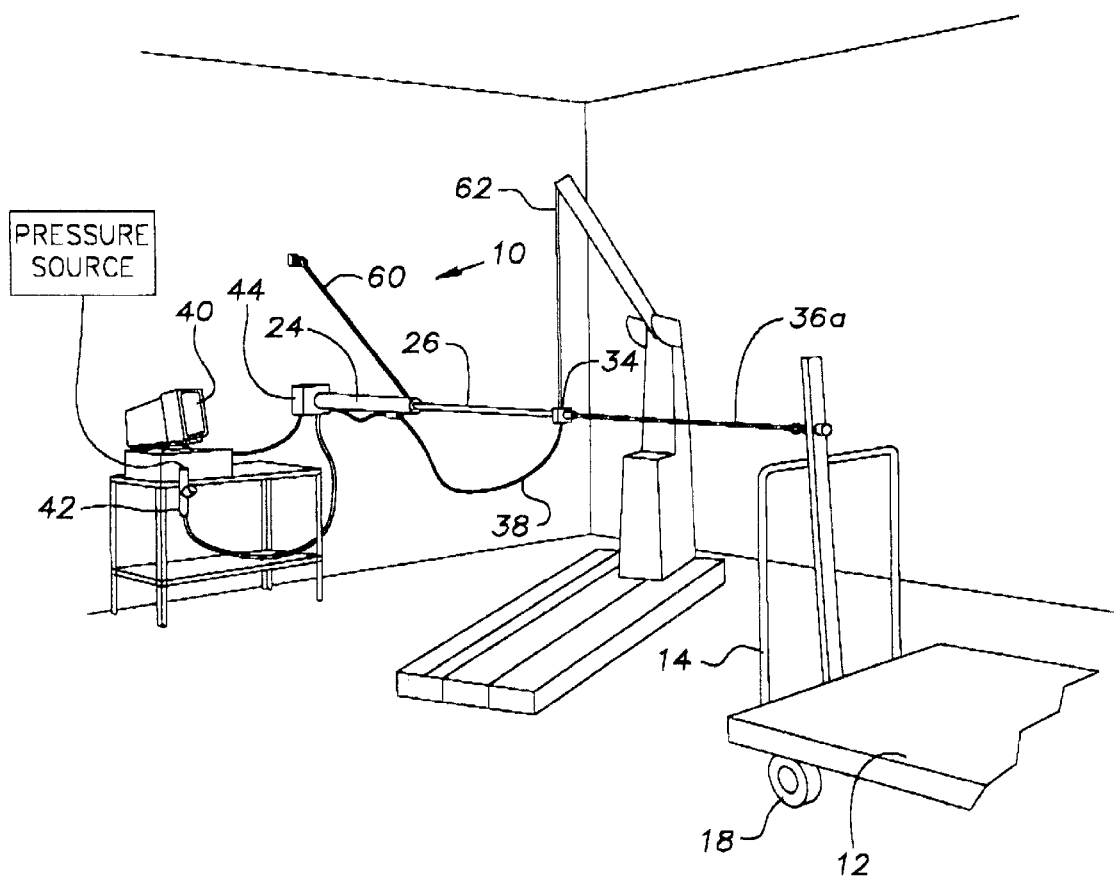
FIG. 3 is a schematic perspective view showing a preferred realization of the first preferred embodiment shown schematically in FIG. 1; and, FIG. 4 schematically illustrates a force generating device according to the present invention.

With reference to FIG. 3, a preferred realization of the first preferred embodiment shown schematically in FIG. 1 is illustrated. Reference numbers identical to those of FIG. 1 have been used for ease of understanding. The device 10 is shown mounted in a fixed location, such as a laboratory, but may instead be portable insofar as it can be taken onto the factory floor and used to measure forces on carts that are actually being used in their normal environment. The results of such floor tests may be useful in determining when a cart should be rebuilt or replaced, for example. The device 10 further deviates from that shown schematically by providing first and second supports 60, 62 for the load member 26.

The first support 60 extends from a distal end of the force generating device 24, to a fixed support, such as a wall or beam, and serves to support a proximal end of the load member 26. The first support 60 is secured to the fixed support at a location relatively above the force generating device 24, which, in turn, is also mounted to a fixed support (i.e., wall or beam).

The second support 62 is secured to the distal end of the load member 26 adjacent the load cell 34, and extends essentially vertically to a fixed support. The fixed support may be a ceiling or beam, or may be provided by a boom assembly, as shown in FIG. 3. In this regard, the position of the second support 62 during movement of the load member 26 is considered important. The inventors have found that the second support 62 should be essentially vertically directed and perpendicular to the axis of the load member 26 when the load member is at a midpoint of its stroke. This neutral position reduces the influence of tangential or component forces, resulting from the movement of the load member 26 and the stationary disposition of the second support 62, on the measurement of forces.

Naturally, other equivalent support structures could also be employed without departing from the scope and spirit of the present invention. For example, the distal end of the second support 62 (i.e., the one secured remote from the load member) could be made to move synchronously with the load member to continuously maintain the second support 62 perpendicular to the load member 26. Moreover, the second support could be provided by a series of rollers disposed beneath the load member 26 and operable to continuously support the load member throughout its stroke.

It is noted that the assembly illustrated in FIG. 3 is specially adapted to measure pulling forces and, as such, includes the load member or shaft 26 that extends from the force generating device 24. The load cell 34 is attached to the distal end of the shaft 26, and a flexible cable 36a extends from the load cell 34 to the cart 12. This structure is considered to be equivalent to that described hereinbefore wherein the load cell 34 was interposed directly between the distal end of the load member (shaft) 26 and the cart 12.

The controller 40, in this case a computer running appropriate software, is operable to initiate a test procedure by opening the solenoid valve (not shown in FIG. 3) to introduce pressurized fluid into the force generating device 24. The controller 40 receives force data from the load cell 34, stores the data in memory and displays the information in a predetermined desired format. In this regard, the display of data includes the display on the monitor as well as reports generated by use of the computer software to present the data in tabular formats more desirable for comparative purposes. Such tabular format would include data from more than one test procedure on the same or different carts.

Use of the device 10, 10' according to the various embodiments of the present invention in a testing procedure will hereinafter be described. The first steps in the test procedure are loading the cart 12 with a test load and orienting the swivel casters 18 perpendicular to the direction of travel. Placing the casters 18 in this position simulates the hardest-possible start up condition that a worker may encounter with the cart 12 and provides a defined starting point from which reliable data can be generated for each cart being tested. The test load may be any load that the cart may be expected to carry, for example 100 or 200 pounds.

When the device 10, 10' according to either embodiment of the present invention is operated as a pushing force measuring device, pressurized fluid is introduced into the cylinder 24 to move the piston 28 and associated load member (shaft) 26 toward the first end 14 of the cart 12.

Alternatively, when the device 10, 10' according to either embodiment of the present invention is operated as a pulling force measuring device, pressured fluid is introduced into the cylinder 24 to move the piston 28 and associated load member (shaft/cable) 26 such that the first end 14 of the cart 12 is moved toward the force generating device. In each case, the load cell 34 transmits the sensed force data to the controller 40 and the controller 40 stores the sensed data as the cart 12 moves through the piston stroke. It has been found by the inventors that substantially identical results are achieved regardless of whether the cart is pushed or pulled, so the method of operation of the device according to the present invention may be considered to be a matter of operator preference that should have no bearing on the collected data quality.

In tests conducted by the inventors, fluid pressure is applied to the force generating device (cylinder) in a controlled fashion to move the cart through the full stroke of the piston (i.e., two feet) in about three seconds. Naturally, these distance and time values may be varied without departing from the scope of the present invention.

Typically, there is a pressure ramp-up during an initial phase, and the test time period (i.e., three seconds) is measured from the first initial movement of the cart, which is correlated to a drop in pressure from a peak pressure. The test distance or travel of the cart corresponds to the end of the piston stroke wherein the load cell will no longer sense force applied to the cart, but will rather show the cart, due to its momentum, applying force of an opposite value or direction on the load cell and load member.

Preferably, the controller 40 rapidly samples the load cell data throughout the test. The sample rate, for example, may be 100 samples per second. Although the force applied to the cart is particularly important data for further use, the high data sampling rate permits further data or information, such as cart acceleration and velocity data, to be derived. Preferably, the test for each cart is performed several times to ensure that testing anomalies do not negatively influence the collected data.

The collected data is preferably used to construct a database that may be used to select, design, and manufacture carts that are optimized for specific loading conditions. More specifically, the collected data includes sensed data, derived data, and input data relating to physical characteristics of the cart that may influence the cart's performance in the tests or information necessary to subsequently identify the cart being tested. Such physical characteristics include, for example, the caster or wheel size, the manufacturer, the cart model or part number, etc. By performing the aforementioned tests on carts of all possible configurations under various expected loading conditions, the performance of each cart configuration can be experimentally determined. The performance data is assembled into a database. A cart buyer, seller, or manufacturer will use the database to select or identify the optimal cart for a particular application.

For example, if a cart is needed that, based upon its intended use in the factory, will carry a maximum load of 100 pounds, the cart buyer will access the database and select the cart that provides optimal performance (minimum force to move) under that load requirement. If two or more carts have identical performance, the operational performance of the carts under the maximum load conditions can be used for further comparison of the carts. For example, the operational performance includes the derived acceleration and velocity data, and this derived data may be used as a second criterion to further assist in identifying the preferred cart to be used for this application.

It is considered apparent that use of the database resulting from the present invention will be useful to both the cart buyer and the cart manufacturer. Presumably, implementing an optimal cart by using the information available from the stored test results will benefit the worker by reducing the force necessary to move the cart. Moreover, the transportation of items using the carts will also be speeded up.

Although the present invention has been described with particularity herein, it is considered apparent that numerous rearrangements, modifications, substitutions of parts may be resorted to without departing from the scope and spirit of the present invention. Therefore, the present invention is not to be limited to that specifically described herein, but rather is only defined by the claims appended hereto.

What is claimed is:

1. A device for measuring forces exerted on a movable element, said device being fixed in position with respect to said movable element and comprising:
   a force generating device that is selectively actuatable to move in a first direction;
   a load member that is operatively engaged with said force generating device and said movable element such that forces applied to the load member by the force generating device are applied to the movable element and thereby cause said movable element to move in said first direction in response to actuation of said force generating device to move in said first direction;
   a load cell connected to one of the force generating device and the load member, said load cell being operable to sense the force exerted upon the movable element, said load cell transmitting data corresponding to said sensed force to a controller;
   said controller receiving the transmitted data from the load cell and displaying the transmitted data in a predetermined format.

2. The device for measuring forces according to claim 1, wherein said load member comprises a rigid shaft and said force generating device is a pressure cylinder, said shaft being movable, under the influence of a piston received within the pressure cylinder, between a retracted position and an extended position.

3. The device for measuring forces according to claim 2, wherein said device is adapted to measure pushing and pulling forces on said movable element, said pulling forces being exerted as said shaft is moved from the extended position to the retracted position to thereby move said movable element in the first direction and said pushing forces being exerted as said shaft is moved from said retracted position to said extended position to thereby move said movable element in a second direction, said second direction being opposite to said first direction.

4. The device for measuring forces according to claim 3, wherein said load member further comprises a pivotal arm assembly, said pivotal arm assembly being disposed between said shaft and the movable element.

5. The device for measuring forces according to claim 4, wherein said pivotal arm assembly includes an upper arm and a lower arm, each of said upper and lower arms having a first end and a second end, said upper arm being pivotally secured to said shaft adjacent said upper arm first end, said second end of said upper arm being pivotally secured to said first end of said lower arm, said second end of said lower arm being operatively linked to said including a first end adjacent said shaft and a second end pivotally secured to the movable element.

6. The device for measuring forces according to claim 5, wherein said first end of said upper arm is hingedly secured to a support.

7. The device for measuring forces according to claim 5, wherein the device is adapted to measure pushing and pulling forces on said movable element, pushing forces being exerted as said shaft is moved from the retracted position to the extended position to thereby move said movable element in the first direction and pulling forces being exerted as said shaft is moved from said extended position to said retracted position to thereby move said movable element in a second direction, said second direction being opposite to said first direction.

8. A device for measuring forces exerted on a cart to move said cart in a first direction, said cart having a first end and a second end, a pair of casters under the first end and a pair of casters under the second end, said first end being adapted for engagement with a load member for exertion of forces on the cart, the device comprising:
   said load member having a proximal end and a distal end, said distal end being operatively engaged with said cart first end while said proximal end being in operative engagement with a force generating device, said force generating device being operable to move said load member in said first direction;
   a load cell connected to the load member and being operable to sense the force exerted by said load member on said cart, said load cell transmitting data indicative of said sensed force to a controller;
   said controller being adapted to actuate the force generating member, to receive data transmitted from said load cell, and to display said transmitted data in a predetermined format.

9. The device for measuring forces according to claim 8, further comprising a coupler disposed between said load member and said cart first end, said load cell being disposed between said coupler and said load member.

10. The device for measuring forces according to claim 9, wherein said load member comprises a rigid shaft and said force generating device is a hydraulic cylinder, said shaft being movable, under the influence of the hydraulic cylinder, between a retracted position and an extended position.

11. The device for measuring forces according to claim 10, wherein device is adapted to measure pushing and pulling forces on said cart, said pulling forces being exerted as said shaft is moved from the extended position to the retracted position to thereby move said cart in the first direction and said pushing forces being exerted as said shaft is moved from said retracted position to said extended position to thereby move said cart in a second direction, said second direction being opposite to said first direction.

12. The device for measuring forces according to claim 10, wherein said load member further comprises a pivotal arm assembly, said pivotal arm assembly being disposed between said shaft and said coupler.

13. The device for measuring forces according to claim 12, wherein said pivotal arm assembly includes an upper arm and a lower arm, each of said upper and lower arms having a first end and a second end, said upper arm being pivotally secured to said shaft adjacent said upper arm first end, said second end of said upper arm being pivotally secured to said first end of said lower arm, said second end of said lower arm being operatively linked to said including a first end adjacent said shaft and a second end pivotally secured to said coupler.

14. The device for measuring forces according to claim 13, wherein said first end of said upper arm is hingedly secured to a support.

15. The device for measuring forces according to claim 13, wherein device is adapted to measure pushing and pulling forces on said cart, said pushing forces being exerted as said shaft is moved from the retracted position to the extended position to thereby move said cart in the first direction and said pulling forces being exerted as said shaft is moved from said extended position to said retracted position to thereby move said cart in a second direction, said second direction being opposite to said first direction.

16. A device for measuring forces exerted on a cart, said forces including pulling forces for moving said cart in a first direction relatively toward said device, said cart having a first end facing said device and a second end facing away from said device, a pair of casters under the first end and a pair of casters under the second end, said first end being adapted for engagement with a load member for exertion of the forces on the cart, the device comprising:

said load member having a proximal end and a distal end, said distal end being operatively engaged with said cart first end while said proximal end being in operative engagement with a force generating device, said force generating device being operable to move said load member in said first direction so as to pull said cart toward said device;

a load cell connected to the load member and being operable to sense the force exerted by said load member on said cart, said load cell transmitting data indicative of said sensed force to a controller;

said controller receiving said transmitted data and displaying said transmitted data in a predetermined format.

17. The device for measuring forces according to claim 16, further comprising a coupler disposed between said load member and said cart first end, said load cell being disposed between said coupler and said load member.

18. The device for measuring forces according to claim 17, wherein said forces further include pushing forces for moving said cart in a second direction opposite to said first direction, said force generating device being operable to move said load member in said second direction so as to push said cart away from said device.

19. The device for measuring forces according to claim 18, wherein said load member comprises a rigid shaft and said force generating device is a hydraulic cylinder, said shaft being movable, under the influence of the hydraulic cylinder, between a retracted position and an extended position.

20. The device for measuring forces according to claim 19, wherein said load member further comprises a pivotal arm assembly, said pivotal arm assembly being disposed between said shaft and said coupler.

21. The device for measuring forces according to claim 19, wherein said controller is further operable to control actuation of said hydraulic cylinder.

22. The device for measuring forces according to claim 20, wherein said pivotal arm assembly includes an upper arm and a lower arm, each of said upper and lower arms having a first end and a second end, said upper arm being pivotally secured to said shaft adjacent said upper arm first end, said second end of said upper arm being pivotally secured to said first end of said lower arm, said second end of said lower arm being operatively linked to said including a first end adjacent said shaft and a second end pivotally secured to said coupler.

23. The device for measuring forces according to claim 22, wherein said first end of said upper arm is hingedly secured to a support.

24. A method for measuring forces exerted to move a cart in a first direction, wherein a force applying and measuring device is disposed in a fixed location relative to the cart, said device including a load member, a force generating device, and a load cell, said cart having a first end facing said device and a second end facing away from said device, the method comprising the steps of:

operatively engaging said load member with the first end of said cart;

actuating said force generating device to move said load member in said first direction and thereby apply forces to move said cart in said first direction;

using said load cell to measure the forces applied to said cart by said load member; and, transmitting said measured first-direction forces to a controller that is operable to display the measured first-direction forces in a predetermined format.

25. The method for measuring forces according to claim 24, said method further being adapted to measure forces exerted to move said cart in a second direction, said method comprising the further steps of:

actuating said force generating device to move said load member in said second direction and thereby apply forces in said second direction to move said cart in said second direction;

using said load cell to measure forces applied to said cart by said load member; and, transmitting said measured second-direction forces to the controller, said controller being operable to display the measured second-direction in the predetermined format.

* * * * *

UNITED STATES PATENT AND TRADEMARK OFFICE
CERTIFICATE OF CORRECTION

PATENT NO. : 6,666,097 B2
DATED : December 23, 2003
INVENTOR(S) : Smith

It is certified that error appears in the above-identified patent and that said Letters Patent is hereby corrected as shown below:

<u>Column 7,</u>
Line 51, delete "claim 3" and insert -- claim 2 --.

Signed and Sealed this

Fourth Day of May, 2004

JON W. DUDAS
*Acting Director of the United States Patent and Trademark Office*